J. DUGAN.

Bottle-Lock.

No. 5,151. Reissued Nov. 19, 1872.

*Witnesses:*

Sydney E. Smith,

W. S. McFarlan

James Dugan by Attorneys

Brown & Allen

AM PHOTO-LITHOGRAPHIC CO. N.Y. (OSBORNE'S PROCESS.)

UNITED STATES PATENT OFFICE.

JAMES DUGAN, OF NEW YORK, N. Y., ASSIGNOR TO LUTHER C. WICKS.

IMPROVEMENT IN BOTTLE-LOCKS.

Specification forming part of Letters Patent No. 93,866, dated August 17, 1869; antedated August 12, 1869; reissue No. 5,151, dated November 19, 1872.

*To all whom it may concern:*

Be it known that I, JAMES DUGAN, of the city, county, and State of New York, have invented a new and useful Improvement in Caps for Locking Bottles, Demijohns, and other like vessels; and I do hereby declare that the following is a full, clear, and exact description of the same, reference being had to the accompanying drawing forming part of this specification, in which—

Figure 1:
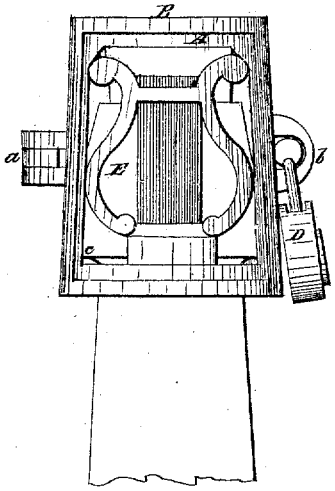
Figure 2:
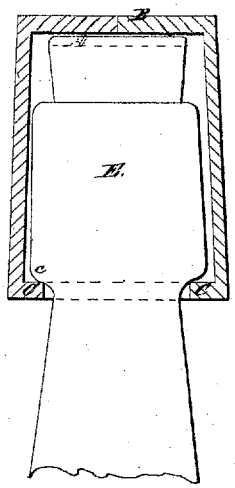
Figure 3:
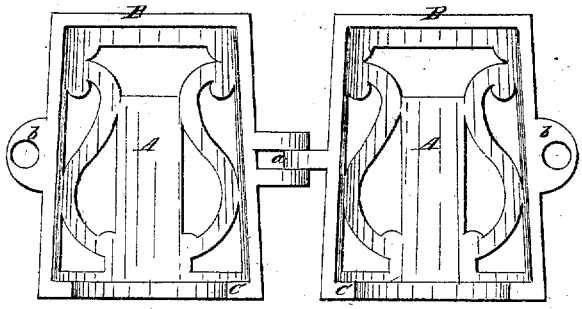

Figure 1 represents a locking-cap constructed in accordance with my invention, showing the same in its closed condition and as applied to a bottle-neck; Fig. 2, a vertical section of said cap under similar circumstances; and Fig. 3, an interior view of said cap as thrown open.

Similar letters of reference indicate corresponding parts.

My invention relates to caps of a detachable character used for securing bottles, demijohns, and other naked vessels closed with a cork or stopper to protect said receptacles from being opened and their contents from being extracted surreptitiously or otherwise without opening or removing the cap. Said invention or improvement consists in a longitudinally divided and hinged or opening-and-closing cap, capable of being fastened, when closed, by a lock, and constructed so that when shut it embraces the neck of the bottle or other vessel and covers the cork or stopper, and is formed with an interior lower flange or projection arranged to lie under the swell or rib on the neck, so that said cap cannot be drawn off or removed without being unlocked and opened.

Referring to the accompanying drawing, A A are the two halves or opening-and-closing portions of a vertically or longitudinally divided cap, hinged as at *a*, and made of metal or other suitable material, with a top or tops, B, and lower contraction or internal projections C, also being provided at its opening-and-closing edges with a lock or means for locking the cap. A padlock, D, the bow of which passes through projections *b b* at the junction of the two portions of the cap opposite to the hinge, will answer the purpose, and such lock, being independent of the cap, may be used for other purposes or for different caps.

Instead of making the vertically or longitudinally divided cap of independent sections hinged together it may be struck out of sheet metal in one piece and have a spring-like action to admit of its being opened and closed in a similar manner; and it may be made of different shapes to fit differently-shaped bottle or vessel necks. The construction, however, represented in the drawing will suffice to explain the peculiar character of the invention.

Its application is as follows: The cap having been unlocked, the sections A A are opened and the cap slipped over or passed around the neck of the bottle, after which said sections are closed and locked. Thus situated and locked, the cap, it will be seen, cannot be drawn off from the neck E of the bottle, by reason of its lower contracted portion or internal projections C catching under the swell or rib *c* of the neck on any attempt to lift the cap from off the latter; and, inasmuch as said cap is more or less of a closed-in character at its top, the cork or stopper cannot be withdrawn from the neck without first unlocking or removing the cap.

By making the cap to open and close as described, and forming it with a lip or flange-like projection, C, the same is more readily applied to the neck, and one cap may be made to suit various-sized necks. There being no adjustment necessary of the projection or flange C, its action as a stop to prevent withdrawal of the cap when closed is rendered certain.

I am aware that bottle-stoppers made with a cap hinged horizontally and containing a flexible material have heretofore been used. These, therefore, I do not claim; but What is here claimed, and desired to be secured by Letters Patent, is—

The vertically or longitudinally opening-and-closing cap B, formed with a lower contraction or internal projection C, and provided with means for locking it when closed, substantially as shown and described, and for the purpose or purposes specified.

In testimony whereof I have hereunto subscribed my name before two subscribing witnesses.

JAMES DUGAN.

Witnesses:
HENRY T. BROWN,
FRED. HAYNES.